United States Patent Office 2,947,399
Patented Aug. 2, 1960

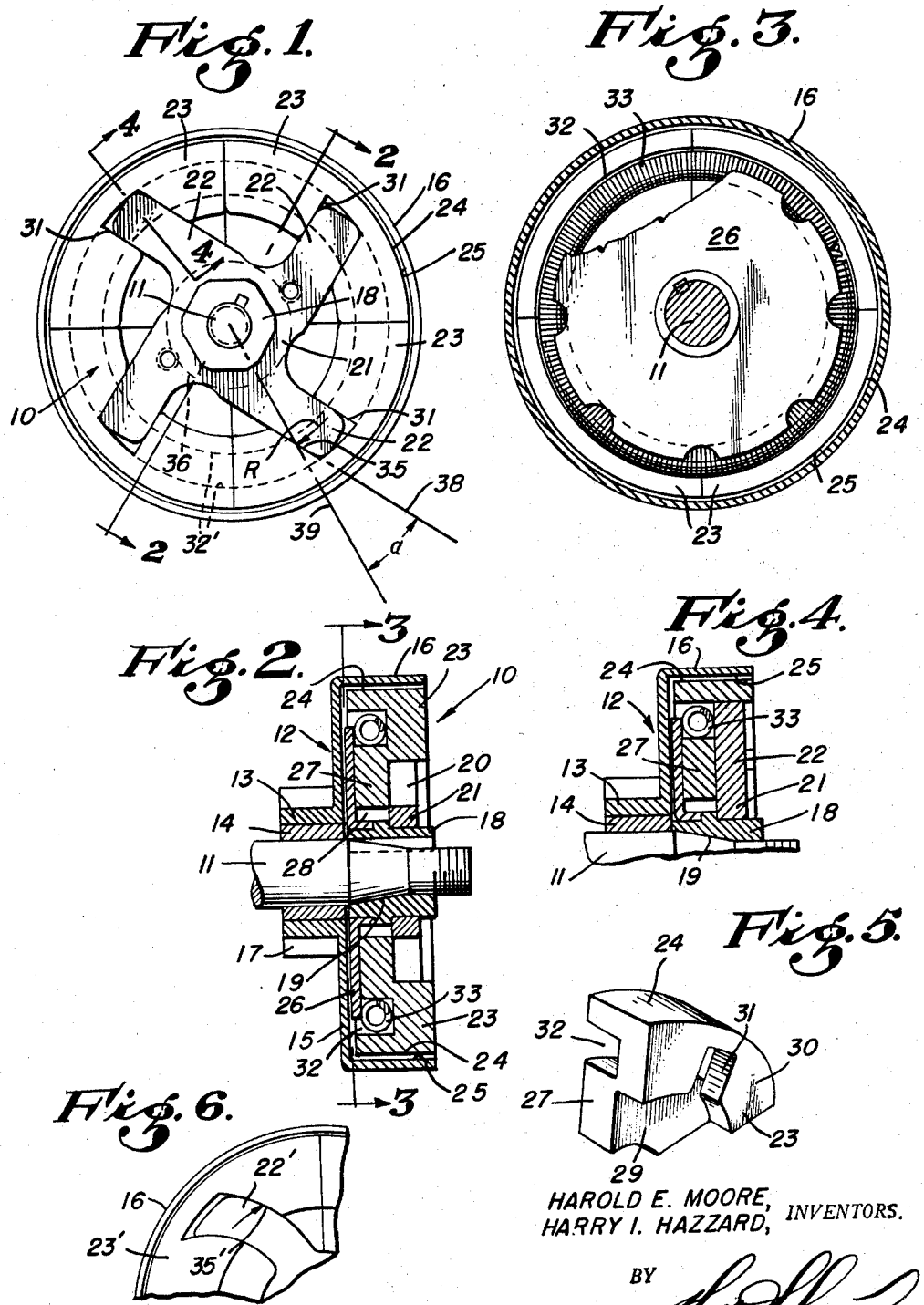

2,947,399
CENTRIFUGALLY ACTUATED FRICTION CLUTCH

Harold E. Moore, Torrance, and Harry I. Hazzard, Los Angeles, Calif., assignors to McCulloch Corporation, Los Angeles, Calif., a corporation of Wisconsin Filed July 29, 1957, Ser. No. 674,847

4 Claims. (Cl. 192—105)

This invention relates in general to friction clutches for transmitting torque and relates in particular to clutches which have parts which are brought into frictional clutching engagement with a driven member by centrifugal force acting when the speed of the driving shaft is increased above a predetermined idling speed.

The invention is of a special utility in devices wherein a small gasoline engine is employed to drive a tool member, one example of which is a gasoline engine powered chain saw. When the engine is idling, the clutch is automatically disengaged, and therefore, not driving effect is imparted to the tool member, but when fuel is fed to the engine, causing an increase in the speed of its output shaft, the clutch will come into action and drive the tool member. Thereafter, when the feeding of fuel to the engine is discontinued and the speed of the engine shaft is reduced, the clutch will automatically disengage.

It is an object of the invention to provide a centrifugally actuated clutch in which slippage of the clutch shoes relatively to the clutch drum is minimized, thereby reducing the wear which occurs between the frictionally engaging parts and also reducing to a minimum the heat generated between the frictionally engaging parts of the clutch.

It is an object of the invention to provide a clutch of this character having sectorial shoes which are moved outwardly into engagement with the drum by centrifugal force, and which clutch has cam means acting when rotary movement of the shoes is retarded due to their engagement with the clutch drum to urge the shoes outwardly into pressural engagement with the clutch drum which is considerably greater than the pressural engagement of the clutch shoes with the drum by action of centrifugal force alone. The effect of the arrangement is to reduce clutch slippage so that the driven part is brought up to operating speed with minimum delay, and when operating speed is reached a positive driving action is accomplished.

It is an object of the invention to provide a centrifugally actuated clutch having a hub portion with a spider mounted on one end thereof and a circular plate adjacent the other end thereof in spaced relation to the spider, with a complement of clutch shoes arranged in a circle around the hub these shoes having inner portions which extend in the space between the plate and the spider and having slots to receive the arms of the spider so that rotation of the spider imparts rotation to the clutch shoes so that they will revolve around the axis of the hub and be caused to move outwardly by centrifugal force therein.

It is a further object of the invention to provide a clutch of the character described in the preceding paragraph wherein the spider arms do not extend radially outwardly but recede rearwardly so that the front faces of these arms are tangential to a circle scribed around the axis of rotation. The guide arms of the spider therefore have a cam action against the clutch shoes to move them outwardly toward the clutch drum with a force supplementing the centrifugal force which acts within the clutch shoes.

A further object of the invention is to provide in this clutch a simple means for applying and retaining the spring which resists outward movement of the clutch shoes.

Further objects and advantages of the invention may be brought out in the following part of the specification wherein the preferred embodiment of the invention is described in considerable detail for the purpose of making a complete disclosure without intending, however, to limit the scope of the invention defined by the appended claims.

Referring to the accompanying drawings which are for illustrative purposes only:

Fig. 1 is a face view of the clutch;

Fig. 2 is a cross section taken as indicated by the line 2—2 of Fig. 1;

Fig. 3 is a back view of the clutch partly section as indicated by the line 3—3 of Fig. 2;

Fig. 4 is a fragmentary section taken as indicated by the line 4—4 of Fig. 1;

Fig. 5 is a perspective front face view of one of the clutch shoes; and

Fig. 6 is a fragmentary face view showing a form of cam which compensates for change in size of the wearing parts as the wear thereof occurs.

In the form of the invention shown in Figs. 1 to 5, there is a driving member 10 adapted to be fixed on the end of the shaft 11, and a driven member 12 having a hub 13 containing therein a bearing 14 which surrounds a portion of the shaft 11 and permits relative rotation of the shaft 11 and the driven member 12.

The driven member 12 includes a circular radial wall 15 which extends outwardly from the hub 13 and a cylindrical drum 16 which surrounds the driving member 10. Gear teeth 17 are formed on the hub 13 for driving engagement with a gear which forms part of a mechanism to be driven.

The driving member 10 includes a hub 18 having a tapered bore 19 for cooperation with the tapered end of the shaft 11. A spider 20 is mounted adjacent one end of the hub 18 and is fixed thereon so that it will rotate with the hub 18. This spider 20 includes a hub portion 21 having outwardly extending guides 22 for engagement with sintered metal clutch shoes 23 which are arranged in a circle around the hub 18 and the spider 20. The clutch shoes 23 are sectorial and have outer surfaces 24 which are segments of a cylinder and are adapted for frictional engagement with the inner surface 25 of the drum 16 when the shoes 23 are moved outwardly from the positions in which they are shown in Figs. 1–4, inclusive.

In spaced relation to the spider 20, and on the opposite end of the hub 18 from that on which the spider 20 is mounted, there is radially directed guide plate 26. Each of the clutch shoes 23 has an inner portion 27 which extends into the space 28 between the spider 20 and the guide plate 26. Each shoe 23 has adjacent the inner portion 27 thereof a depression 29 which receives a segment of the hub portion 21 of the spider 20, and radially outwardly of its depression 29 the shoe has a wall portion 30 with a notch or slot 31 to receive the end portion of one of the guide arms 22 of the spider 20 whereby rotational movement of the spider arm 20 will be transmitted to the clutch shoe 23 which is engaged by an arm 22. The slots 31 are intermediate the ends of the shoes 23.

Adjacent the periphery of the guide plate 26, each clutch shoe 23 has therein an arcuate channel 32. When the clutch shoes 23 are in their operative positions, as shown in Fig. 1, the arcuate channels 32 define a circular channel indicated by dotted lines 32' which receives a circular tension spring 33 having the function of exerting upon all of the clutch shoes 23 a yieldable, radially inwardly directed force tending to retract the shoes 23 and control their outward movement under centrifugal force which increases in the shoes 23 as the speed of rotation thereof around the axis of the shaft 11 increases.

The guide arms 22 extend in a plane which is normal to the axis of rotation of the clutch structure. That is to say, the center lines of the arms 22 lie in a plane which is perpendicular to the axis of rotation of the shaft 11. They are described as receding with respect to the direction of rotation R of the driving member 10. By this terminology is meant that the arms 22 are not radial but have a rearward slope so that they may be described as receding rearwardly. The front face 35 of each arm 22 is tangential to a circle 36 scribed around the axis of the shaft 11, and will therefore lie at an angle to the tangent indicated by the arrow R and will have a cam action against the cooperating shoe 23 which will urge the shoe 23 outwardly, thereby providing an outward force which will supplement the centrifugal force acting upon the shoe 23.

In the form of the invention shown in Figs. 1–5, the guide arms 22 recede at an angle a of about 30°. This angle a is the angle which exists between a line 38 coinciding with the face 35 of the arm 23 and a radial line 39 which passes through the center of the shaft 11 and intersects the front face 35 of the arm 22 at a point in substantially the center of the area of engagement between the arm 22 and the adjacent wall of the slot 31.

When the shaft 11 is operated at idling speed, the clutch shoes 24 will be retracted. When operation of the driven device is desired the engine speed is increased so that the increased speed of rotation of the shoes 23 around the axis of the shaft 11 will cause them to move outwardly against the tension of the spring 33. The outer surfaces of the shoes 23 will be brought into sliding frictional engagement with the drum and impart a driving force thereto. The drum will resist forward rotation of the shoes, and therefore, the shoes will react against the cam faces 35 of the spider arms 22, with the result that the cam faces 35 will exert against the shoes 23 forces having an outward component which will supplement the centrifugal force then acting within the shoes.

One form of the invention provides means which will compensate for reduction in the sizes of the wearing parts as the result of wear. This form of the invention, as shown in Fig. 6, has guide or driving arms 22' which are similar to the arms 22 but curve spirally outwardly and rearwardly with the result that as wear occurs between the faces of the shoes 23', and the drum 16 and the shoes 23' must move further outwardly in order to engage the drum 16, the camming effect of the curved front face 35' of the arms 22' will be increased, and the arms 22' therefore will exert a larger outward force against the shoes 23' to compensate for the greater expansion of the spring 33 required in order for the outer faces of the shoes 23' to make engagement with the drum 16.

We claim:

1. In a centrifugally actuated clutch: a driving member adapted to be connected to a driving shaft comprising a hub, a spider fixed on said hub, said spider comprising outwardly extending guide arms which lie in a plane normal to the axis of said hub and are disposed tangentially to a circle described around said axis so as to recede rearwardly relative to the direction of driving rotation, sectorial clutch shoes arranged around said spider, said shoes having guide slots intermediate the ends of said shoes and corresponding to said arms to receive said arms of said spider in guiding relationship so that the leading faces of said arms drivingly engage adjacent walls of said slots, the angle at which each of said arms recedes rearwardly being approximately 30° between a line coinciding with the leading face of said arm and a radial line from the axis of said hub intersecting said leading face at a point substantially in the center of the area of engagement between said leading face and the adjacent wall of the guide slot in which it is received; yielding means urging said shoes inwardly on said guide arms; and a driven member comprising a cylindrical drum surrounding said shoes in position to be frictionally engaged thereby as said shoes are moved outwardly on said guide arms by centrifugal force upon driving rotation of said spider, the leading faces of said guide arms then acting upon said shoes to urge them outwardly into greater pressural engagement with said drum.

2. An apparatus as recited in claim 1 wherein the engaging surfaces of said arms and slots recede spirally rearwardly relative to the direction of driving rotation.

3. In a centrifugally actuated clutch: a driving member adapted to be connected to a driving shaft comprising a hub, a spider fixed on said hub, said spider comprising outwardly extending guide arms which lie in a plane normal to the axis of said hub and are disposed tangentially to a circle described around said axis so as to recede rearwardly relative to the direction of driving rotation, a guide plate extending outwardly from said hub and having a surface axially spaced from a surface of said spider, sectorial clutch shoes arranged around said spider, said shoes having inner portions which project into the space between said spider and said plate, and guide slots intermediate the ends of said shoes to receive said arms of said spider in guiding relationship so that the leading faces of said arms drivingly engage adjacent walls of said slots, the angle at which each of said arms recedes rearwardly being approximately 30° between a line coinciding with the leading face of said arm and a radial line from the axis of said hub intersecting said leading face at a point substantially in the center area of engagement between said leading face and the adjacent wall of the guide slot in which it is received; yielding means urging said shoes inwardly on said guide arms; and a driven member comprising a cylindrical drum surrounding said shoes in position to be frictionally engaged thereby as said shoes are moved outwardly on said guide arms by centrifugal force upon driving rotation of said spider, the leading faces of said guide arms then acting upon said shoes to urge them outwardly into greater pressural engagement with said drum.

4. The apparatus as recited in claim 3 wherein said shoes have an arcuate channel in the outer portion thereof facing and extending circumferentially around the peripheral portion of said plate and said yielding means comprises a circular tension spring in said channel to retract said shoes inwardly on said guide arms, the peripheral portion of said plate retaining said spring in said channel.

References Cited in the file of this patent

UNITED STATES PATENTS

| | | |
|---|---|---|
| 1,841,613 | Libby | Jan. 19, 1932 |
| 1,943,930 | Rock | Jan. 16, 1934 |
| 2,000,713 | Norris | May 7, 1935 |
| 2,224,935 | Schultz | Dec. 17, 1940 |
| 2,243,565 | Kimball et al. | May 27, 1941 |
| 2,381,941 | Wellman et al. | Aug. 14, 1945 |
| 2,552,747 | Strimple et al. | May 15, 1951 |
| 2,809,535 | Hein et al. | Oct. 15, 1957 |

FOREIGN PATENTS

| | | |
|---|---|---|
| 576,715 | France | May 19, 1924 |
| 18,950 | Australia | June 17, 1935 |